US009194608B2

(12) United States Patent
Lorenz et al.

(10) Patent No.: US 9,194,608 B2
(45) Date of Patent: Nov. 24, 2015

(54) REFLECTOR HAVING A TENSION OR PRESSURE ELEMENT THAT IS ADJUSTABLE IN LENGTH AND INTRODUCES FORCES INTO A PANEL FOR THERMAL SOLAR COLLECTORS

(76) Inventors: Pièrre Lorenz, Bottrop (DE); Guenther Kunz, Aachen (DE)

( * ) Notice: Subject to any disclaimer, the term of this patent is extended or adjusted under 35 U.S.C. 154(b) by 211 days.

(21) Appl. No.: 13/578,308

(22) PCT Filed: Feb. 10, 2011

(86) PCT No.: PCT/DE2011/000123
§ 371 (c)(1),
(2), (4) Date: Aug. 27, 2012

(87) PCT Pub. No.: WO2011/098072
PCT Pub. Date: Aug. 18, 2011

(65) Prior Publication Data
US 2012/0312959 A1  Dec. 13, 2012

(30) Foreign Application Priority Data

Feb. 10, 2010 (DE) .......................... 10 2010 007 422
Jul. 1, 2010 (DE) .......................... 10 2010 025 765
Jul. 14, 2010 (DE) .......................... 10 2010 027 034

(51) Int. Cl.
*G01C 21/02* (2006.01)
*F24J 2/10* (2006.01)
(Continued)

(52) U.S. Cl.
CPC ................ *F24J 2/1052* (2013.01); *F24J 2/055* (2013.01); *F24J 2/07* (2013.01); *F24J 2/085* (2013.01);
(Continued)

(58) Field of Classification Search
CPC ............ F24J 2/1052; F24J 2/145; F24J 2/38; F24J 2/10; F24F 2005/0064; G02B 19/0019; G02B 7/198
USPC .............. 250/203.4, 214.1, 216, 239; 356/73, 356/139.01; 126/573, 578, 600; 136/206, 136/214
See application file for complete search history.

(56) References Cited

U.S. PATENT DOCUMENTS 4,103,672 A * 8/1978 Meyer ........................... 126/604
4,493,313 A * 1/1985 Eaton ............................ 126/570
(Continued)

FOREIGN PATENT DOCUMENTS

DE        85 14 766          7/1985
DE        85 14 766 U1       7/1985
(Continued)

OTHER PUBLICATIONS

International Search Report of PCT/DE2011/000123, Mar. 6, 2012.
Patent Examination Report No. 1 in Australian Patent Application No. 2011214699 from IP Australia, dated Mar. 27, 2013.

*Primary Examiner* — Que T Le
(74) *Attorney, Agent, or Firm* — Collard & Roe, P.C.

(57) ABSTRACT

The invention relates to a reflector for uniaxially concentrating thermal solar collectors, comprising an elastic panel and a means that introduces the oppositely directed bending moments from two opposite sides into the panel. The invention further relates to a receiver for highly concentrating thermal solar collectors, the receiver being arranged inside a protective casing, wherein the protective casing is radiopaque and has an opening that is sealed air-tight, through which opening the radiation can penetrate into the interior of the protective casing. One aspect of the invention relates to a sensor for uniaxially and biaxially concentrating thermal solar collectors, the sensor having a hollow body, in which a photoelectric cell is arranged and which has an opening, in which a transparent scattering element is arranged, wherein the outside of the hollow body is reflective to radiation.

11 Claims, 13 Drawing Sheets

(51) Int. Cl.
 *F24J 2/05* (2006.01)
 *F24J 2/07* (2006.01)
 *F24J 2/08* (2006.01)
 *F24J 2/14* (2006.01)
 *F24J 2/38* (2014.01)
 *F24J 2/04* (2006.01)

(52) U.S. Cl.
 CPC .. *F24J 2/145* (2013.01); *F24J 2/38* (2013.01); *F24J 2002/0405* (2013.01); *F24J 2002/1028* (2013.01); *Y02E 10/41* (2013.01); *Y02E 10/43* (2013.01); *Y02E 10/44* (2013.01); *Y02E 10/45* (2013.01); *Y02E 10/47* (2013.01)

(56) References Cited

U.S. PATENT DOCUMENTS

| | | | |
|---|---|---|---|
| 4,678,292 | A | 7/1987 | Miyatani et al. |
| 2008/0073198 | A1 | 3/2008 | Simon |

FOREIGN PATENT DOCUMENTS

| | | |
|---|---|---|
| SU | 1 002 750 | 3/1983 |
| SU | 1 002 750 A1 | 3/1983 |
| WO | WO 2007/087680 | 8/2007 |
| WO | WO 2008/013976 | 1/2008 |

\* cited by examiner

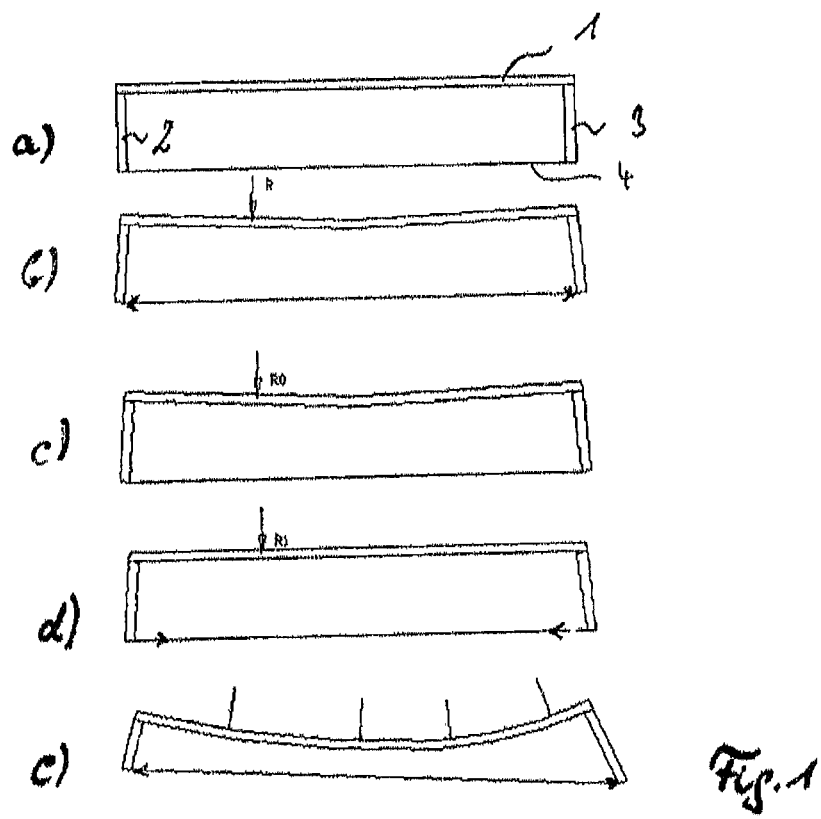
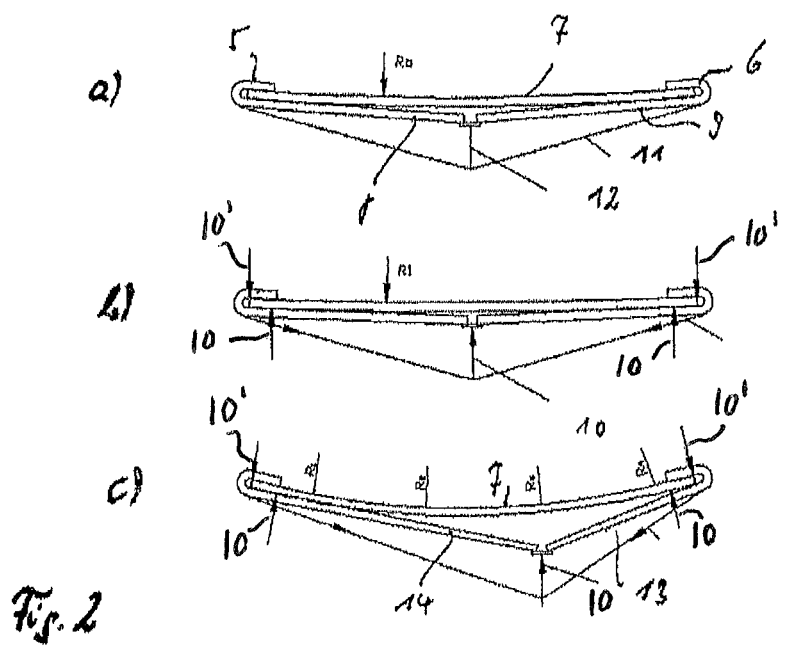

REFLECTOR HAVING A TENSION OR PRESSURE ELEMENT THAT IS ADJUSTABLE IN LENGTH AND INTRODUCES FORCES INTO A PANEL FOR THERMAL SOLAR COLLECTORS

CROSS REFERENCE TO RELATED APPLICATIONS

This application is the National Stage of PCT/DE2011/000123filed on Feb. 10, 2011 which claims priority under 35 U.S.C. §119 of German Application No. 10 2010 007 422.5 filed on Feb. 10, 2010, German Application No. 10 2010 025 765.6 filed on Jul. 1, 2010, and German Application No. 10 2010 027 034.2 filed on Jul. 14, 2010, the disclosures of which are incorporated by reference. The international application under PCT article 21(2) was not published in English.

BACKGROUND OF THE INVENTION

1. Field of the Invention

The invention relates to a reflector, a receiver arrangement, and a sensor for thermal solar collectors.

A first aspect of the invention relates to a reflector for uniaxially concentrating thermal solar collectors having a panel. Such a reflector is preferably used in linearly concentrating solar-thermal collectors for collecting solar radiation. In this connection, incident sunlight is reflected onto a narrow band, the receiver. The receiver converts the radiation energy to heat energy. A medium transports the heat to the consumer.

Linearly concentrating reflectors are reflective surfaces having a concave curvature in one direction. Depending on their use, the surfaces follow concrete mathematical functions. These applications are parabolic trough collectors, Fresnel collectors, and, with some restrictions, also biaxially curved collectors. In the case of parabolic trough collectors, the surface of the reflector follows a parabolic function. In the case of Fresnel collectors, the function is divided up into smaller segments having the length of the collector, in which sections the reflectors are either planar or have a circular concave curvature.

2. Prior Art

Known reflectors consist either of glass with a mirror coating on the back or of a surface-mirrored material having an obligatory protective layer against weathering influences. Glass reflectors are thermally biased from float glass that is planar, at first, and mirror-coated on the back. Surface-mirrored reflectors are produced by means of the application of a reflector layer to a thin metal foil. This is then glued onto a shape-precise substratum.

In the case of thermally bent glass reflectors, the bent glass has a tendency toward unavoidable waviness of the reflectors. In the case of the surface-mirrored reflectors, the precision of the desired optimal surface shape is determined by the precision of the subconstruction. In this connection, the design effort increases with the precision requirements.

SUMMARY OF THE INVENTION

The invention is therefore based on the task of making available a reflector that can be produced in simple manner and demonstrates great precision.

This task is accomplished in that the panel is elastic and has means that introduce oppositely directed bending moments into the panel from two opposite sides.

From the statics of a bending beam, it is known that a constant bending moment at the end of a beam, without the effect of additional external forces, produces a constant curvature over the entire length of the beam. For this reason, the beam first bends to form an arc having a specific radius, as long as the bending moment is acting on the beam in unchanged manner. It is also possible that the bending moments are made to be of unequal size, if one applies additional external transverse forces at the end of the beam, in each instance. These are referred to as bearing forces. In this way, a panel can be shaped in such a manner that the shape of a parabola is formed, in cross-section.

Furthermore, it is possible to elastically deform a panel that has already been pre-bent plastically, with the same force arrangements, to produce a new bending line. A plastically pre-bent panel has a pre-determined radius. Under the influence of external forces and bending moments, the panel elastically deforms to produce a new bending line.

This opens up the possibility of stressing a panel of any desired length, consisting of at least one reflective layer, preferably a sandwich panel, at the side lines, parallel to the bending axis, with an oppositely directed longitudinal bending moment, in each instance. In this connection, the bending moments can be of different size.

Under these conditions, additional transverse forces are induced, which must be taken into consideration in the calculation of the bending line. If the bending moments at the opposite sides are of equal size, in opposite directions, the bending moment that passed through transversely to the bending axis is a constant and bends the panel precisely into an arc. If the bending moments that lie opposite one another are not of the same size, the bending moment progression transverse to the bending axis becomes asymmetrical, and the bending moment is a linear function along the direction transverse to the bending axis. Because the first derivation of the linear bending moment represents a parabola in a general position, any uniaxially curved surface of the panel can be achieved by means of dimensioning, particularly also uniaxially curved reflectors for use in concentrating solar thermics.

In order to be able to transfer the necessary bending moments and transverse forces to the panel, additional means are required as design elements.

Depending on the application case, it is advantageous if the bending moments are of different size.

In this connection, the reflective layer can be a design component of the panel or can be applied to the panel with shape fit.

An advantageous embodiment variant provides that levers that are attached at an angle, preferably attached perpendicular, are affixed on every panel side, in flexurally rigid manner, that the means is a tension or pressure element that is adjustable in length and introduces forces into the panel, by way of the levers, which produce two oppositely directed bending moments and elastically bend the panel to produce a desired bending line.

In this connection, it is advantageous if the pressure forces are absorbed by a tensioning construction.

The angled-away levers can be of different length, depending on their use.

Another embodiment provides that torsion-rigid traverses are affixed on each panel side, and that the forces are introduced by a means that is adjustable in length, in such a manner that two oppositely directed bending moments are formed and the two bending moments elastically bend the panel to produce a desired bending line.

In this connection, the width of the two traverses can be different.

An embodiment variant provides that the means is a pressure element and that the pressure forces are absorbed by means of a flexurally rigid torsion traverse. Another embodiment provides that the means is a tension element that is adjustable in length.

A particular embodiment variant provides that a cam is installed in the means configured as a tension or pressure element, and that a rotation brought about by sun tracking produces a radius enlargement of the reflector by means of the cam, coupled with this rotation, whereby the radius of the reflector is individually adjusted by means of biasing of the pressure or tension element.

Various embodiments of such reflectors are shown in the drawings and will be explained in greater detail below.

BRIEF DESCRIPTION OF THE DRAWINGS

The drawings shows:

FIG. 1 the force introduction by means of attached brackets,

FIG. 2 the force introduction by means of torsionally rigid traverses,

DETAILED DESCRIPTION OF THE DRAWINGS

Figure 3:
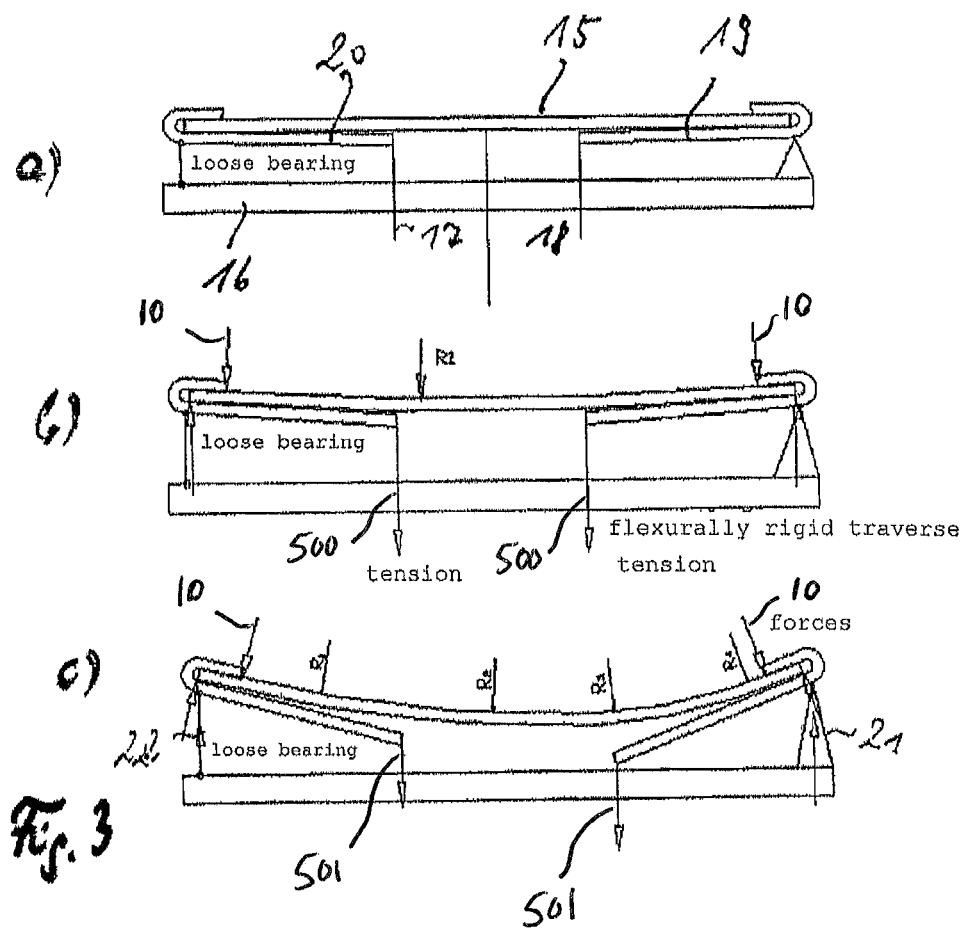
FIG. 3 the force introduction by means of a tension screw element.

FIG. 1 a shows a straight bending beam as a section through a panel 1. At each end, a flexurally rigid additional beam 2, 3 is disposed, disposed vertically. Between the ends of these beams, a tension-pressure element is provided as a pressure-tension connection 4. If one shortens or lengthens this element 4, a force is produced that produces a bending moment onto the horizontal bending beam 1 (panel) over the length of the vertical beam 2, 3. Because of the symmetrical arrangement, the resulting bending moment runs over the entire beam at a constant size, and bends the beam into an arc. The tension leads to a convex curvature, and the pressure leads to a concave curvature. The radius of a bending beam that is already plastically pre-bent is increased or reduced by means of tension or pressure.

If the bending beams 2, 3 disposed vertically are configured with different lengths, as shown in FIG. 1 e, asymmetrical bending occurs. The equation of this bending line is a parabola.

In FIG. 2 a, two further flexurally rigid beams 8, 9 are disposed at both ends 5, 6 of a plastically pre-formed bending beam 7 having a constant curvature radius $R_0$, in such a manner that they are similar to tongs in their method of functioning, if a pressure force 10 is applied in the center, at the ends of the further beams 8 and 9, as in FIG. 2 b. This pressure force 10 produces an oppositely directed bending moment 10' at the ends 5, 6 of the panel 7, which moment changes the original radius $R_0$ to the greater radius $R_1$. This force can be further reinforced by means of tension connections 11 that act on a pressure connection 12.

In FIG. 2 c, it is shown that the bending beam 7 is elastically bent asymmetrically, to produce a parabola, by means of the two tongs-like levers 13, 14, when the lever arms 13, 14 have different lengths.

In FIG. 3 a, a panel 15 is shown, which is at first planar and not plastically deformed. In order to elastically deform this straight beam 15, a flexurally rigid traverse 16 is required. By means of two symmetrically disposed tension screw elements 17, 18, the deflections of the tongs-shaped bending beams 19, 20 can be influenced separately from one another. A symmetrical tension 500 at the points 17 and 18 deforms the bending beam 15, which is planar at first, to produce a circle having a constant radius (cf. FIG. 3 c). If tension forces of different sizes 501 are applied, however, the bending beam deforms asymmetrically and becomes a parabola, which has the optimal shape of a solar collector (cf. FIG. 3 c), by means of precise adjustment. For this purpose, the panel 15 is preferably mounted on a fixed bearing 21 and a loose bearing 22.

With the devices described, it is possible to produce precise circular or parabola-shaped mirrors for uniaxially concentrating collectors, in cost-advantageous manner. Circular mirrors are of great importance for Fresnel technology. When tracking the Fresnel mirrors in accordance with the course of the sun, shortening of the focal length takes place, the value of which is coupled with the angle of rotation. A significant reduction in power follows from this. For this reason, collectors that can track the sun and additionally automatically compensate the shortening of the focal length are optimal. For this reason, automatic sun tracking that possesses these properties is described using the following figures.

Figure 4:
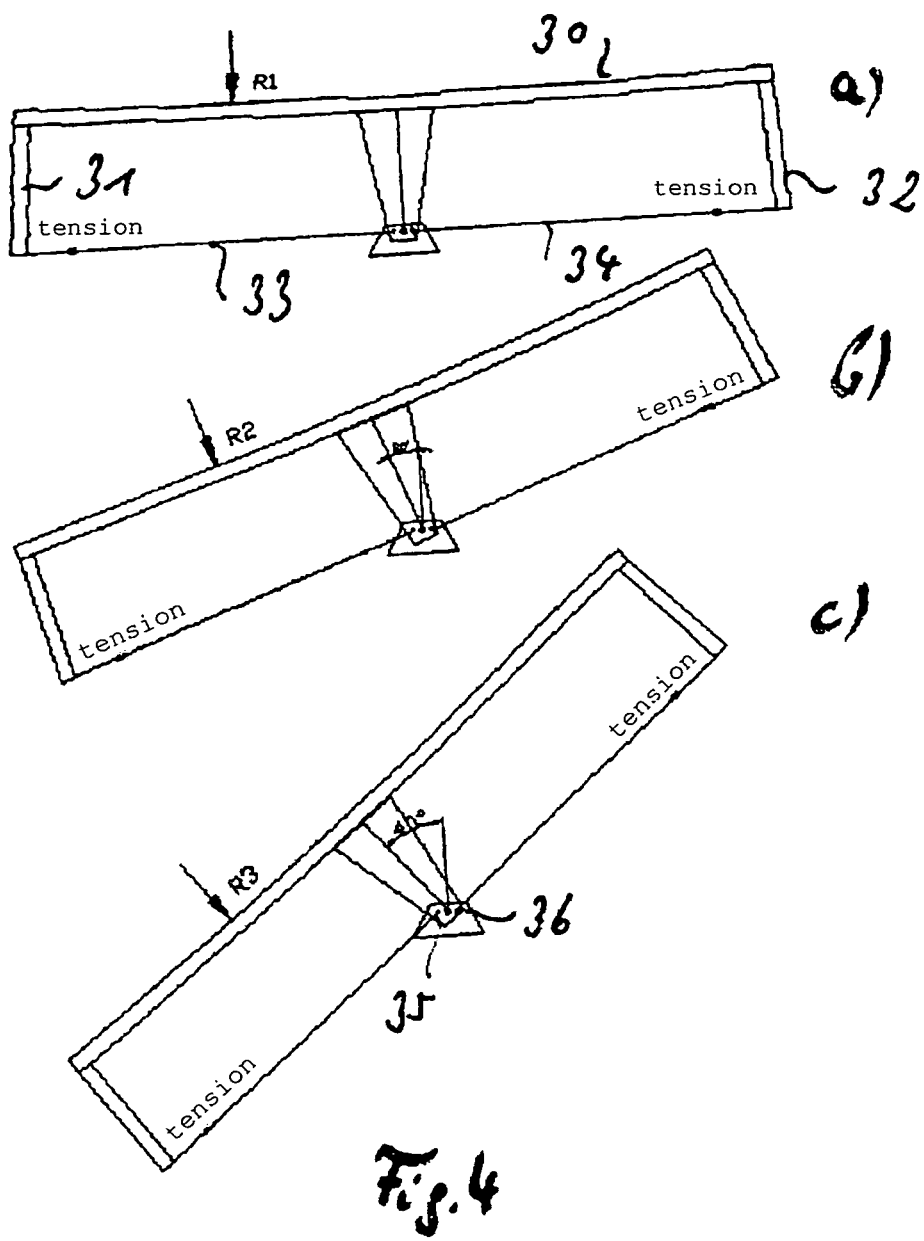
FIG. 4 an autofocus for a Fresnel collector.

In FIG. 4, a cross-section through a Fresnel collector having any desired length is shown. A plastically concave bending beam, bent upward, as a panel, is connected at each end with a further flexurally rigid and vertically attached beam 31, 32. These are precisely as long as the panel 30 in an axis transverse to the plane of the page. At some discrete points along this axis, transverse to the plane of the page, movable tension elements 33 are attached to these beams 31, 32, preferably as wire cables. The other end of these tension elements 33, 34 is attached to a bolt 35, 36 that is mounted eccentrically, so that in the case of rotation of the panel 30 about a longitudinal axis as the result of sun tracking, shortening of the distance between the beams 31, 32 that lie opposite one another, and as a result of this, an increased tension stress is produced. In this arrangement, the lengths of the two tension elements 33, 34 determine the curvature radius of the panel 30, which can thereby be individually adjusted.

Figure 5:
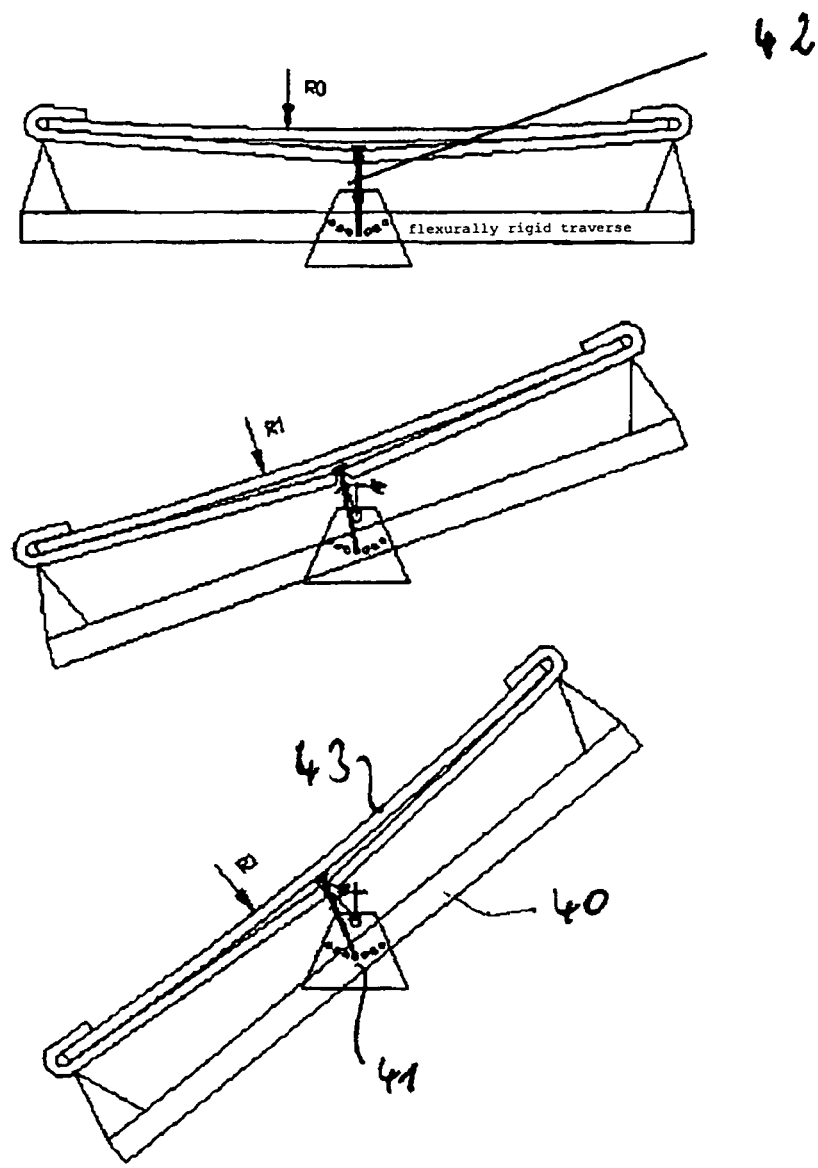
FIG. 5 an autofocus for a panel having a tension element.

The same principle can also be used for a bent panel as shown in FIG. 3. The corresponding arrangement is shown in FIG. 5. Here, the rotation point 40 lies eccentric to an attachment point 41 of a tension element 42. The stronger the rotation of the panel 43 about the rotation point 40, the weaker the tension on the tension element and therefore the force on the panel.

Figure 6:
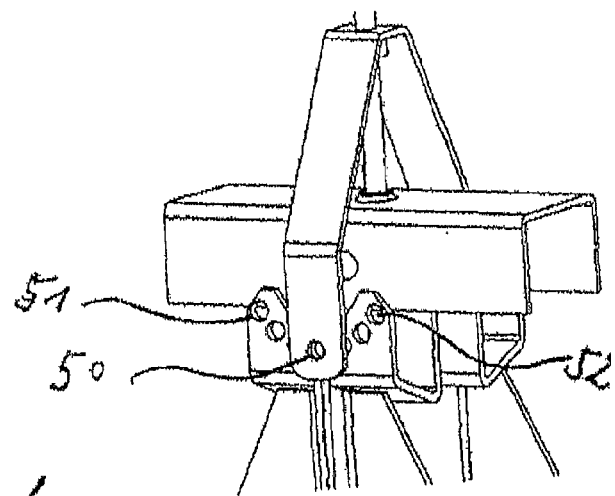
FIG. 6 an autofocus arrangement.

A holder for attachment of a panel is shown in FIG. 6. In this connection, the panel is rotated about the rotation point 50, while tension elements can be attached at the bores 51, 52.

Figure 7:
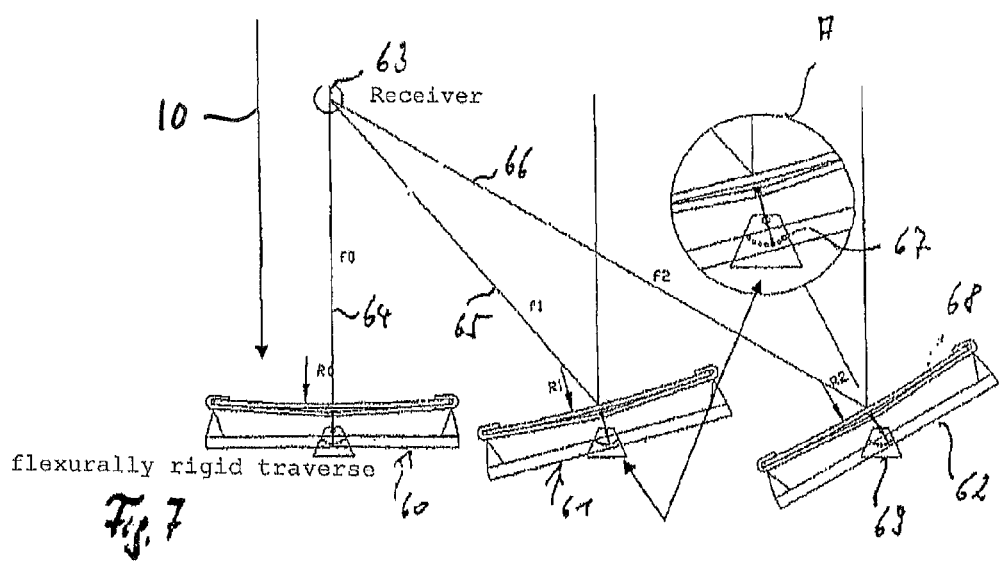
FIG. 7 different cam positions.

Depending on the distance from the receiver, there is an optimal mirror radius for every mirror. This is shown in FIG. 7. In order to orient multiple collectors 60, 61, 62 onto a receiver 63, the reflectors having different focal distances 64, 65, 66 must be oriented differently. This is implemented by means of the eccentric adjustment shown in Detail A. Multiple bores 67 allow a corresponding pre-adjustment. Depending on the rotation of the panel 68 relative to the holder 69, the curvature of the panel 68 and therefore its focusing are optimized.

Figure 8:
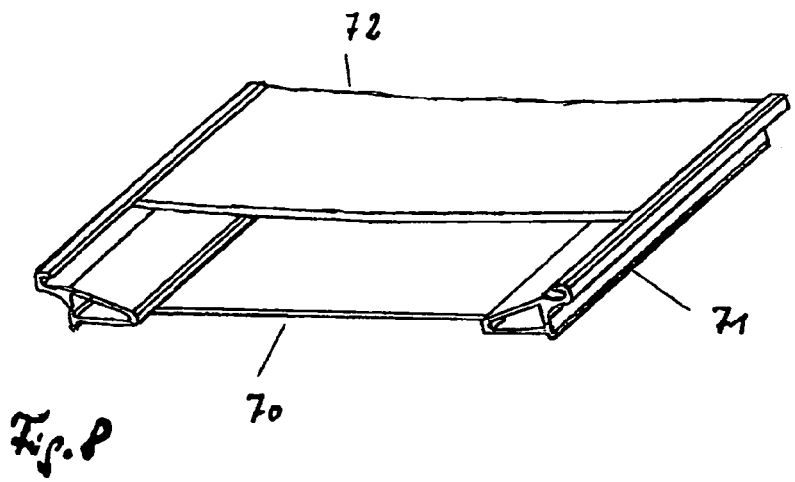
FIGS. 8 to 10 the configuration of different traverses.
Figure 9:
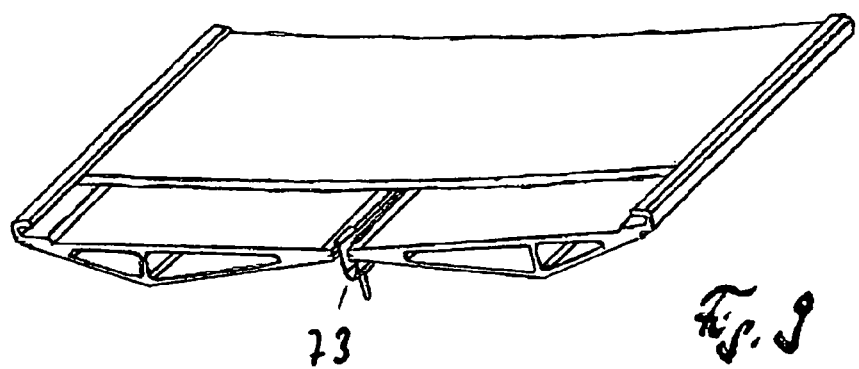
Figure 10:
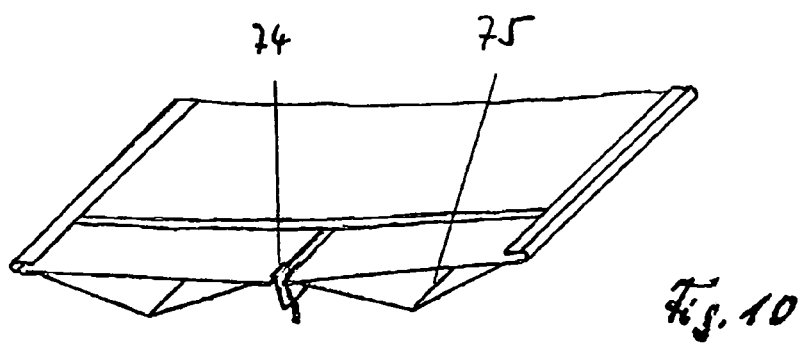

Because the tension elements 70 engage on the vertical bending beams only at discrete intervals, particularly torsionally rigid traverses 71 must be provided in order to bend the panel 72 without twisting. For this reason, a box profile is suitable as a torsion traverse 75, preferably made of sheet metal or as an aluminum extruded profile as shown in FIGS. 8 to 10.

The torsion rigidity can also be increased by means of the number of tension or tension-pressure elements 73, 74 in the longitudinal direction and the distance of the elements relative to one another.

Figure 11:
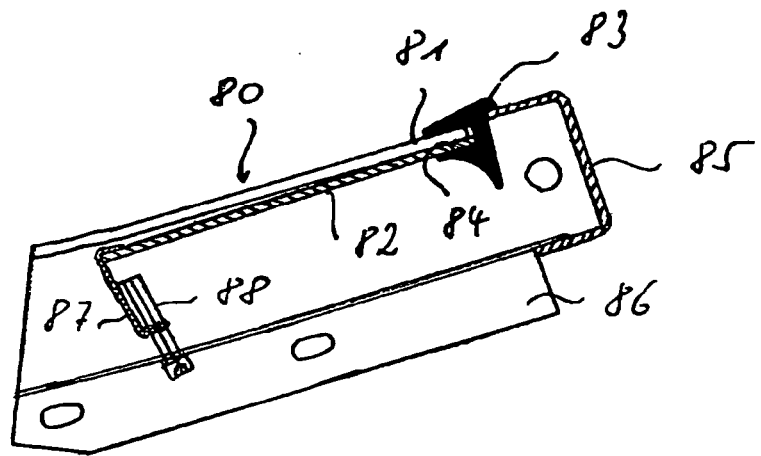
FIG. 11 schematically, a section through a decentralized mechanism for introduction of a moment, FIG. 12 schematically, a section through a central mechanism for introduction of a moment, FIG. 13 schematically, a perspective view of a receiver arrangement, FIG. 14 schematically, a perspective view of the receiver arrangement shown in FIG. 13, enlarged, with a closed rotatable element, FIG. 15 a view according to FIG. 14, with an open rotatable element, FIG. 16 a section through a receiver arrangement according to FIG. 13, with an open rotatable element with a representation of beam paths, FIG. 17 a section with a closed rotatable element, FIG. 18 a section with an open rotatable element, FIG. 19 sections through different receiver arrangements having a square protective mantle, FIG. 20 sections through different receiver arrangements having a circular protective mantle, FIG. 21 receiver arrangements with an open and closed rotatable element, FIG. 22 schematically, open sensors for point-shaped and line-shaped scattering bodies, FIG. 23 a representation according to FIG. 20, with the beam paths drawn in, FIG. 24 a representation according to FIG. 20, with beam paths relevant for the photo-element, FIG. 25 the function of different scattering bodies, FIG. 26 schematically, the movement of the sensor through the focus, FIG. 27 a graphic representation of the intensity of the photocell over time, FIG. 28 an open sensor having two scattering bodies having two photocells, FIG. 29 schematically, a sensor according to FIG. 28, attached to a receiver, FIG. 30 an alternative embodiment of a sensor, and FIG. 31 a section through the sensor shown in FIG. 30.

FIG. 11 shows a simple mechanical structure with which a torque can be introduced at the edge of a parabolic mirror 80 or a Fresnel element. For this purpose, the edge 81, together with a rigid metal sheet 82, is held in a groove 84 of a clamp 83. The clamp 83 lies on a frame 85, opposite the groove 84, which frame is attached to a rigid traverse 86. At the end of the metal sheet 82 that lies opposite the groove 84, a hook 87 pulls the metal sheet 82 toward the traverse 86 by way of a screw 88. In this connection, hook 87 and metal sheet 82 as well as also clamp 83, if applicable, can also be configured in one piece. The tension on the metal sheet 82 leads to a rotational movement at the clamp 83 and thereby to a bending force that acts on the parabolic mirror 80, which elastically deforms the parabolic mirror.

Figure 12:
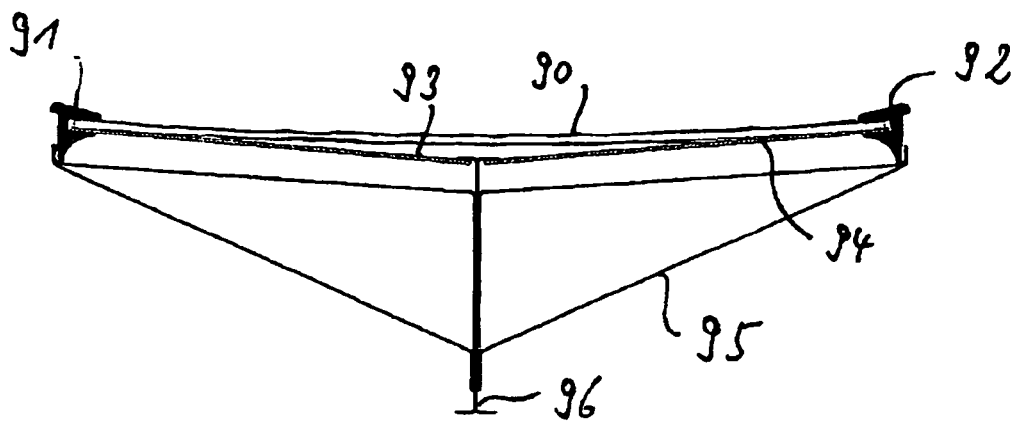

In the arrangement shown in FIG. 12, a Fresnel element 90 is clamped in between two clamps 91 and 92, together with a rigid metal sheet 93, 94, in each instance. The clamps 91 and 92 lie on a holding construction 95 and the metal sheets 93 and 94 are pulled downward relative to the holding construction 95, at their ends that lie opposite the clamps, with a tension element 96. Because the tension element 95 is disposed in the center, below the Fresnel element 90, in this exemplary embodiment, the Fresnel element is bent uniformly in circular shape. If forces on the metal sheets are different in strength in the exemplary embodiments of FIGS. 11 and 12, or if the metal sheets are of different length, bending moments with which the parabolic mirror 80 or the Fresnel element 90 can be bent in parabola shape occur.

Another aspect of the invention relates to a receiver arrangement for highly concentrating thermal solar collectors having a receiver that is disposed within a protective mantle.

Receivers for highly concentrating thermal solar collectors consist of a media-conducting pipe onto which the sunbeams deflected at the reflector are bundled. Radiation energy is converted to heat on the pipe. This heat is conducted away for usage purposes, by means of a flowing medium. For protection against heat losses of the receiver pipe, the pipe is additionally mantled with a sheathing pipe made of glass. The interstice is evacuated. In this way, heat losses are reduced by means of heat conduction. Inherent radiation losses by means of heat radiation of the receiver are reduced by means of a selective coating. However, the effect of the coating decreases with an increasing temperature, so that the selective coating has no effect starting from a certain temperature.

The invention is therefore based on the task of proposing a receiver arrangement that solves this problem.

This task is accomplished with a receiver arrangement of the stated type, in which the protective mantle is radiopaque and has an opening closed in airtight manner, through which the radiation can penetrate into the interior of the protective mantle. The receiver thereby becomes a hollow space emitter. An ideal hollow space emitter is a closed space having highly absorbent interior walls, ideal heat insulation, and a defined opening that is in radiation exchange with its surroundings.

It is therefore proposed that the inside of the protective mantle is configured to be radiation-absorbent. An alternative embodiment provides that the inside of the protective mantle is configured to be radiation-reflective.

The degree of effectiveness of the receiver arrangement is increased in that the protective mantle is heat-insulating.

A particularly preferred embodiment provides that an evacuated, transparent hollow body, preferably made of glass, is inserted into the opening of the protective mantle. In this connection, it is advantageous if a rotatable element is inserted into the evacuated transparent hollow body, which element can be disposed in a position that blocks the penetration of the radiation and in a position that allows radiation to pass through. Preferably, these are two discrete positions, so that the rotatable element can be held in one of these positions, in each instance, using a switching means.

For this purpose, it is proposed that the receiver arrangement has a magnet that lies outside the evacuated transparent hollow body, with which magnet the position of the element can be adjusted. Cumulatively or alternatively, it is proposed that it has a bimetal that automatically adjusts the position of the element as a function of temperature.

If little radiation can penetrate into the receiver arrangement from the outside, it is proposed to keep the temperature in the receiver arrangement high, in that the element is configured to be radiation-reflective on the side that faces to the inside in the closed position.

If it is supposed to be prevented that the receiver overheats, the element can be configured to be radiation-reflective on the side that faces to the outside in the closed position.

If a heat-conducting, preferably liquid medium is supposed to be heated in the receiver, it is proposed that the receiver has at least one pipe. This pipe is disposed within the protective mantle.

However, the protective mantle itself can also serve as a pipe. Particularly for heating gaseous media, it is proposed that the receiver has a metal sheet that is bent open. However, the insides of the protective mantle can also already be configured to be heat-absorbing, in such a manner that it is possible to do without placement of a receiver within the protective mantle.

Exemplary embodiments of such receiver arrangements are shown in the drawing and will be explained in greater detail below.

The drawing shows

Figure 13:
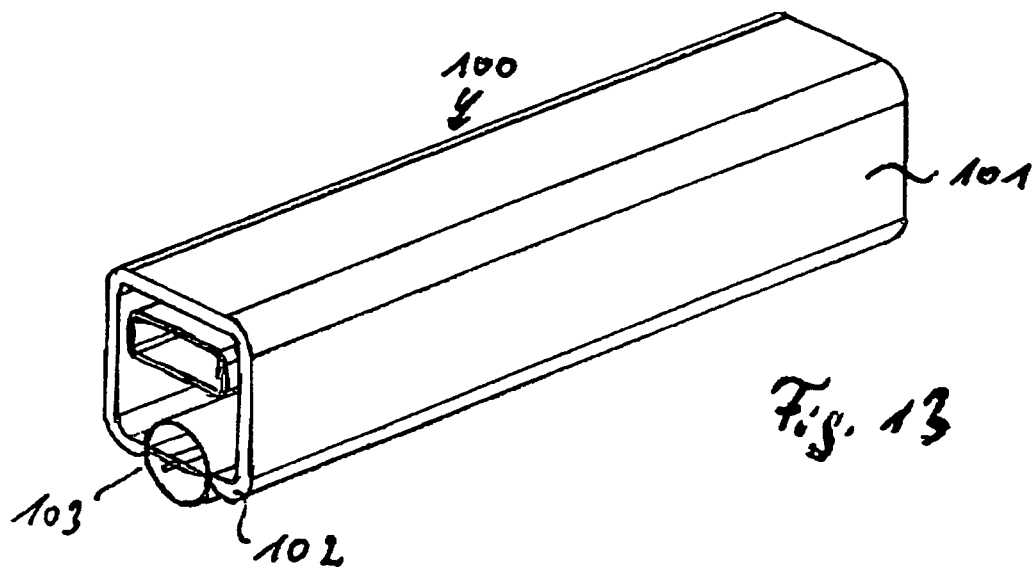
Figure 14:
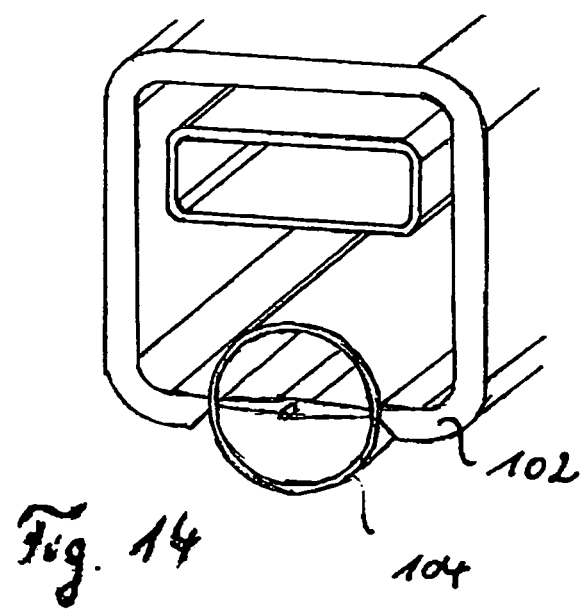
Figure 15:
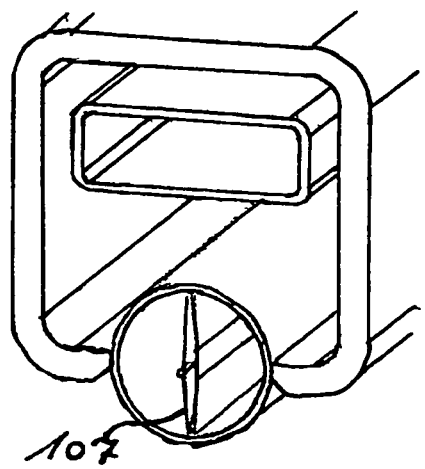
Figure 16:
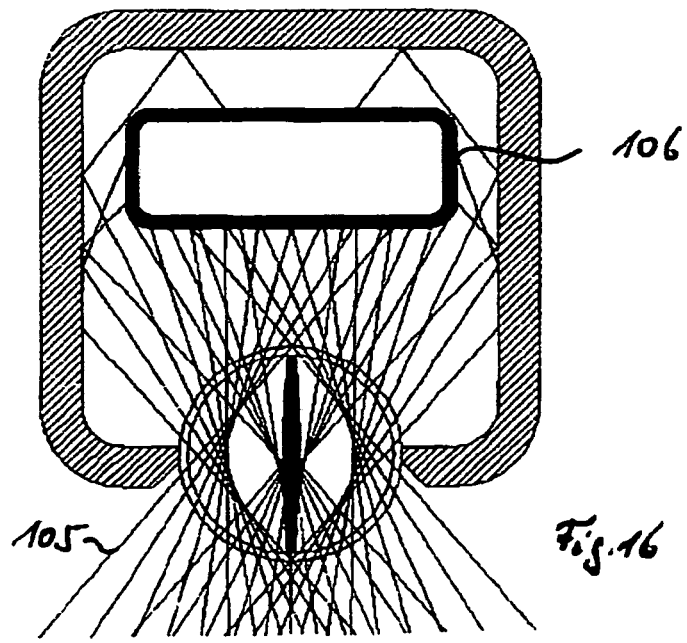
Figure 17:
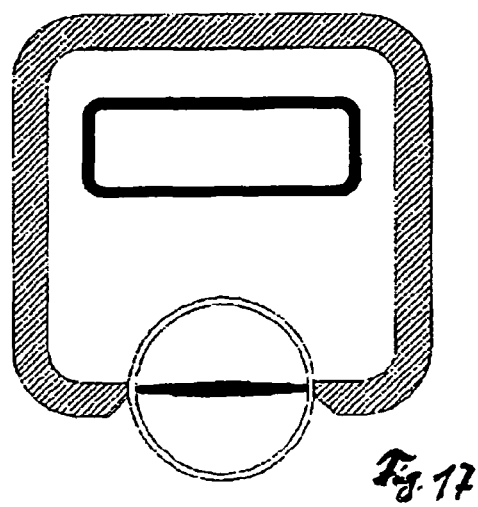
Figure 18:
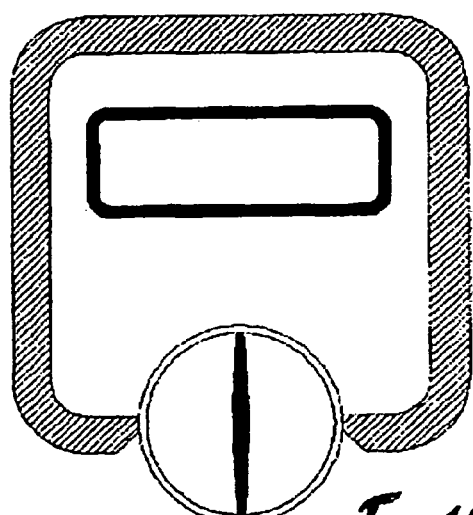
Figure 19:
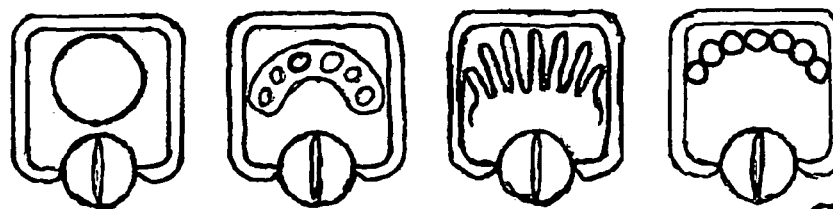
Figure 20:
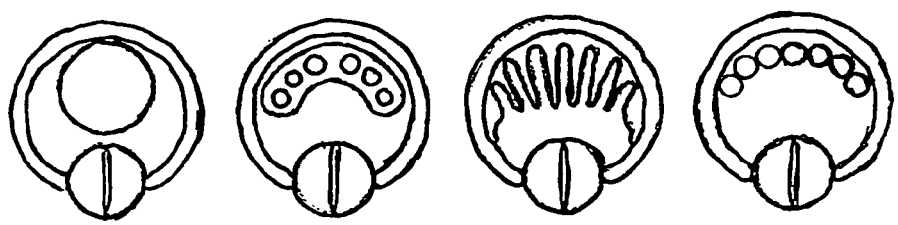
Figure 21:
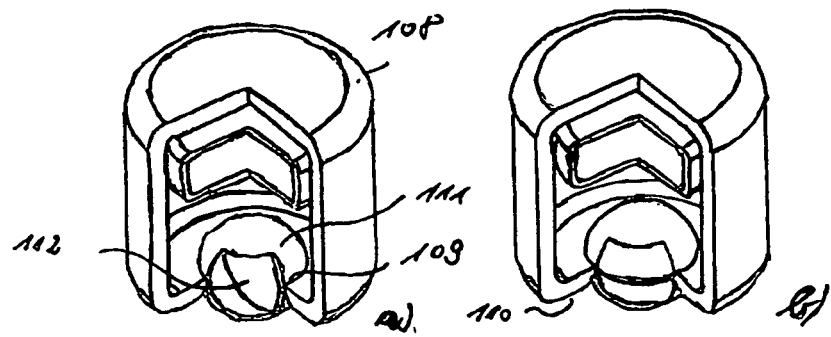

FIG. 13 schematically, a perspective view of a receiver arrangement,

FIG. 14 schematically, a perspective view of the receiver arrangement shown in FIG. 13, enlarged, with a closed rotatable element, FIG. 15 a view according to FIG. 14, with an open rotatable element, FIG. 16 a section through a receiver arrangement according to FIG. 13, with an open rotatable element with a representation of beam paths, FIG. 17 a section with a closed rotatable element, FIG. 18 a section with an open rotatable element, FIG. 19 sections through different receiver arrangements having a square protective mantle, FIG. 20 sections through different receiver arrangements having a circular protective mantle, and FIG. 21 receiver arrangements with an open and closed rotatable element.

The receiver arrangement 100 shown in FIG. 13 consists of a hollow body 101 having any desired length, with strongly absorbent interior walls. The walls consist of multiple layers of high-quality insulation material and, on the outside, of highly reflective metal sheets, which together have the task of minimizing the heat loss to the surroundings.

The lower wall 102 has a slit 103. Glass tubes 104 having a short length, which are sealed at both ends and evacuated, are laid into this slit. These tubes allow the incident concentrated radiation 105 to penetrate into the interior of the hollow body 101 in unhindered manner. There, the radiation impacts the actual receiver 106. The latter can be configured as a media-conducting hollow profile. However, a receiver can also be used that is formed by a body that on the one hand absorbs the radiation well and, on the other hand, can give off the heat that forms, again, to a flowing medium. Embodiment variants of such receivers are shown in FIGS. 19 and 20.

Rotatable reflectors 107, which can be brought into a vertical or a horizontal position, without performing rotation and without making contact, from the outside, as needed, are laid into the glass tubes 104. This is preferably done by means of magnetic force. An alternative provides for a bimetal element that reacts to the receiver temperature and switches over from a horizontal to a vertical position at a specific temperature. In this connection, the bimetal element can be disposed in the hollow space of the protective mantle 101, in order to act on the rotatable element in accordance with the hollow space temperature.

A special embodiment of a receiver arrangement for biaxially concentrating collector systems is shown in FIG. 21. In place of the elongated hollow body receiver, here there is a rotation-symmetrical hollow cylinder 108 having a circular opening 109 on its underside 110. An evacuated hollow sphere 111 made of glass is laid into this opening 109, which sphere also has a rotatable reflector 112 as a rotatable element for closing the opening 109 against penetrating radiation.

Such receivers have a plurality of advantages as compared with known receivers. In particular, temperatures that keep a thermal oil liquid can be maintained in the receiver arrangement even at night. By means of displacing the effective receiver surface back from the focus zone, the power transmission surface area can be increased, thereby achieving a reduction in power density.

A third aspect of the invention relates to a sensor for uniaxially and biaxially concentrating thermal solar collectors. Using such a sensor, it is possible to detect the precision of reflector surfaces in contact-free manner, by means of measurement technology, on the one hand, and on the other hand, extremely precise sun tracking can be implemented.

The invention is therefore based on the task of further developing such a sensor.

This task is accomplished with a sensor of the stated type, in that it has a hollow body in which a photocell is disposed, and which has an opening in which a light-permeable scattering body is disposed, whereby the outside of the hollow body is configured to be radiation-reflective.

In this connection, the hollow body can absorb the impacting light beams completely, on its interior. This can be implemented by means of matte, black interior surfaces. The scattering body, which is preferably recessed into a thin wall, acts as a point-shaped light source on the top of the wall. The scattering body should therefore be configured in such a manner that it extremely scatters the beams that impact on it on the outside. This can be implemented in that a glass having a high optical index of refraction is roughened, whereby the physical composition of the blasting means and the impact velocity must be optimized in order to be able to achieve a great scattering effect.

Depending on the area of application, the scattering body is spherical or cylindrical. Different embodiment variants provide that the hollow body has a box-shaped interior shape, a cylindrical interior shape, or a conical interior shape.

A particular embodiment provides that the hollow body has two photocells. In particular if the hollow body has two photocells, it is furthermore advantageous if the hollow body has two light-permeable scattering bodies.

A special arrangement having a sensor of the stated type provides that the sensor is disposed in such a manner that the scattering body is positioned in such a manner that it faces away from the sun direction but faces the reflective surface. This allows a method in which the thermal solar collector is positioned as a function of the light intensity at the sensor.

Different embodiment variants of such sensors are shown in the drawing and will be explained in greater detail below.

The drawing shows

Figure 22:
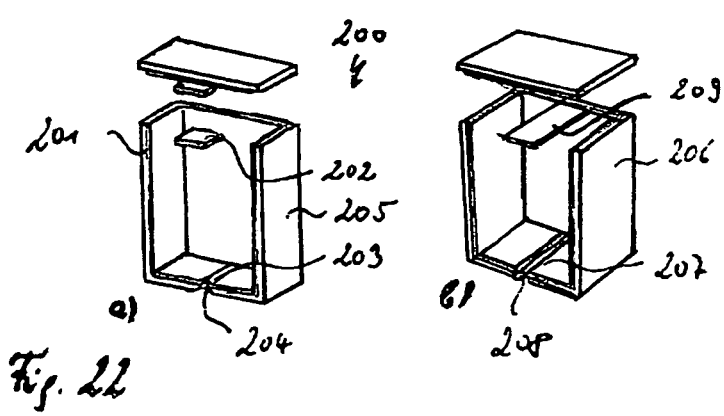
Figure 23:
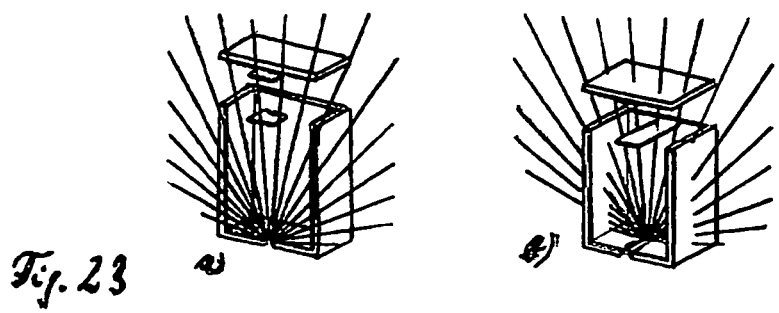
Figure 24:
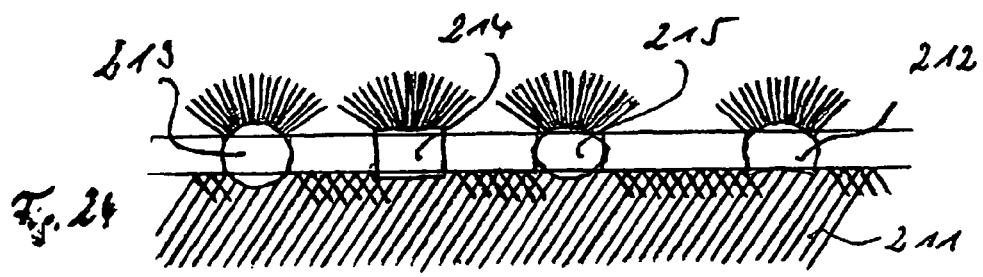
Figure 25:
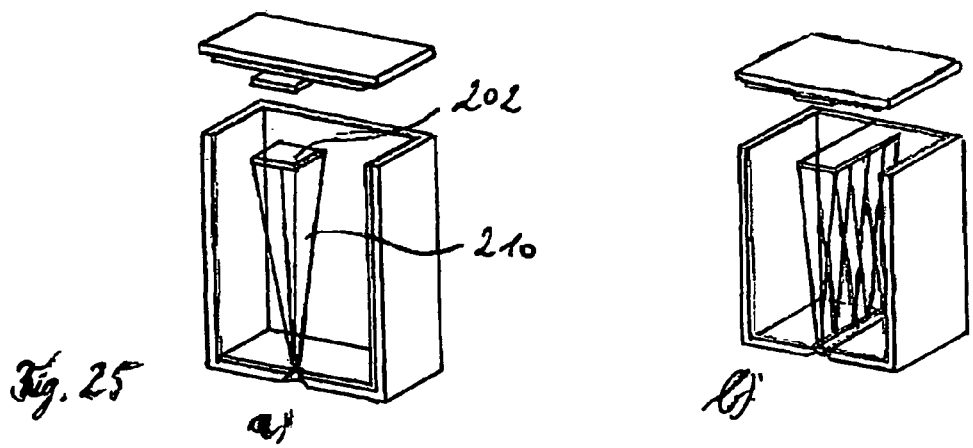
Figure 26:
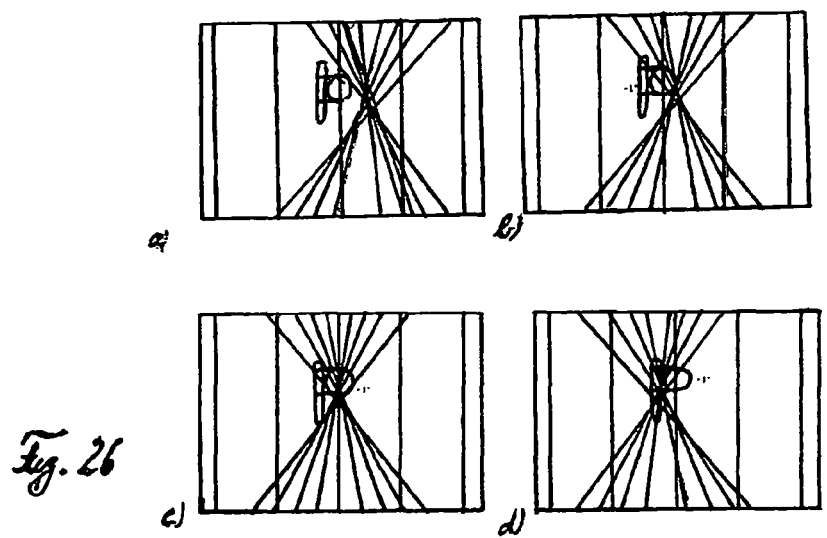
Figure 27:
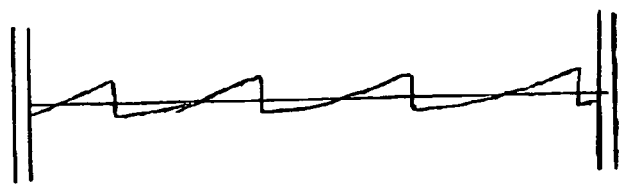
Figures 28, 29, 30, 31:
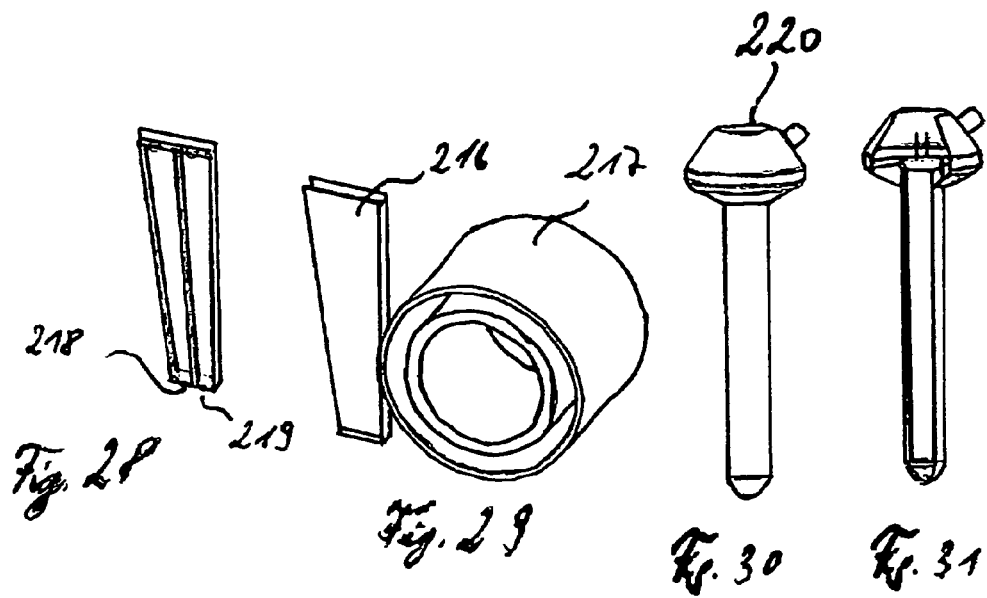

FIG. 22 schematically, open sensors for point-shaped and line-shaped scattering bodies, FIG. 23 a representation according to FIG. 20, with the beam paths drawn in, FIG. 24 a representation according to FIG. 20, with beam paths relevant for the photo-element, FIG. 25 the function of different scattering bodies, FIG. 26 schematically, the movement of the sensor through the focus, FIG. 27 a graphic representation of the intensity of the photocell over time, FIG. 28 an open sensor having two scattering bodies having two photocells, FIG. 29 schematically, a sensor according to FIG. 28, attached to a receiver, FIG. 30 an alternative embodiment of a sensor, and FIG. 31 a section through the sensor shown in FIG. 30.

The sensor 200 shown in FIG. 22 *a* has a hollow body 201 in which a photocell 202 is disposed. At the bottom of the hollow body 201, there is a point-shaped opening 203 having a spherical scattering body 204. The outside 205 of the hollow body 201 is configured to be radiation-reflective, so that radiation can penetrate into the interior of the hollow body 201 only through the opening 203.

FIG. 22 b shows a corresponding arrangement of a hollow body 206 with an elongated gap 207 and a cylindrical scattering body 208.

As shown in FIGS. 22 and 24, the scattering body brings about the result that a very great radiation intensity outside the hollow body 201, 206, leads to a very weak but proportional radiation intensity within the hollow body.

The intensity of the light source that the scattering body 204, 208 forms within the hollow body 201, 206 decreases with the square of the distance of the photocell 202, 209 from the light source. All the beams that impact the optically black interior walls of the hollow body 201, 206 are absorbed there. Therefore, according to clear geometrical relations, a fraction of the original radiation impacts the photocell 202, 209 at the upper end of the hollow body 201, 206.

FIG. 24 a shows that the radiation source forms a conical spatial element 210 with the photocell 202. Therefore the electrical voltage produced at the photocell 202 is proportional to the external radiation intensity, but very greatly weakened.

FIG. 25 shows how in the case of spherical or elongated scattering bodies, light 211 that impacts from below is scattered as it passes through the scattering body 212. For this purpose, different scattering body geometries are shown as scattering bodies 213, 214, 215. Light 211 that impacts from below, having a very great radiation intensity, is first scattered on the lower, optically rough surface, and passed into the glass body at a low but fixed percentage. There, the scattered beams impact on the also optically rough surface of the scattering body, on the inside of the hollow body 201, 206, and are there scattered in all directions once again. Only a small but fixed percentage gets into the interior of the hollow body by way of the scattering. The longer the distance between radiation entry and photocell, the lower the intensity at the photocell 202.

If such a sensor is attached in the vicinity of a focal point or a focal line of a solar collector, the result can be achieved, by means of rotation of the arrangement, that the external part of the scattering body migrates through the entire light cone or the light prism. An example of this is shown in FIGS. 26 a-d. In this connection, the photocell in the sensor registers a signal proportional to the light intensity. In the case of reflector deviations, compactions and decreases in light intensity occur in the vicinity of the focal point or the focal line.

It is possible, with two functions of the intensity registered with the sensor, by way of the angle of rotation, at different radii, to make a statement concerning the shape precision of the reflector surfaces, in each instance. In this way, the quality of reflectors can be measured in simple manner.

A further application of the sensor lies in its function as a measurement value transducer for sun tracking. If one attaches a sensor in the vicinity of the focal point or the focal line, in such a manner that the relatively small and therefore point-shaped or line-shaped scattering body just touches the flank of the light cone or the light prism, at an exact rotational position of the reflector, further movement of the sun leads to the result that the scattering body enters into the very radiation-intensive zone. The sensor then registers a sudden increase in voltage. If the voltage exceeds a certain amount, a motor is turned on, by way of a relay, which motor rotates the arrangement of sensor and collector in such a manner that the scattering body is outside the light-intensive zone again. Consequently, the registered voltage then drops to zero and the motor comes to a stop.

By means of a very simple electronic circuit, it is possible to achieve the result that so-called hysteresis occurs. This means that the trigger threshold for turning on and shutting off are different from one another.

In FIG. 26 a, the scattering body is at a very slight distance from the light prism at a precise angular position. When the sun moves further, the scattering body penetrates into the prism and the motor is turned on until the voltage at the photocell is back at zero.

By means of reducing the hysteresis, it is possible to make the precision of the tracking as precise as desired. In the borderline case, at hysteresis zero, tracking takes place infinitely frequently. In order to regulate this frequent further regulation to a reasonable degree, one only needs to increase the hysteresis. Then the motor still continues to run for a period of time, and the scattering body is at a defined distance from the light prism at shutoff. The procedure then requires a certain period of time until the scattering body touches the light flank once again, as the result of further movement of the sun.

Because a proportional relationship exists between the time interval of the switching procedures, the precision of the tracking is determined in this way. The intensity over time is shown in FIG. 27. By means of reduction of the hysteresis, the precision can be increased to 0.01 degrees. In this case, the time interval only amounts to 10 seconds.

It is advantageous if the method of sun tracking described is coupled with a terrestrial control. The terrestrial control is based on the possibility of calculating the precise sun position for the season and the geographical latitude. Precise control only according to the terrestrial principle would bring with it very high costs in the adjustment of all the possible tolerances.

For this reason, a case differentiation is advantageously undertaken in the control. In the absence of sun, the terrestrial control is adjusted in such a manner that the reflector always leads the invisible sun by a certain distance. If the sun shines again, due to the weather, a switch takes place from terrestrial control to sensor control. According to the selected lead, a certain time interval is required until the sensor dips back into the light flank. Afterward, the sensor takes over tracking, with the required precision.

FIGS. 28 and 29 show an advantageous sensor 216 in the vicinity of a receiver pipe 217. If necessary, different control precisions can be achieved by means of the two scattering bodies 218, 219 that are affixed one behind the other, depending on what signal is being evaluated.

A simple sensor 220 is shown in FIGS. 30 and 31.

An elongated scattering body according to FIGS. 22 b, 23 b, and 24 b has the advantage, as compared with a spherical scattering body, that partial shadowing resulting from construction parts of the receiver attachment is balanced out.

The invention claimed is:

1. Reflector for uniaxially concentrating thermal solar collectors, having a panel which is elastic and has means that introduce oppositely directed bending moments into the panel from two opposite sides, wherein levers that are attached at an angle, preferably attached perpendicular, are affixed on every panel side, in a flexurally rigid manner, and wherein the means is a tension or pressure element that is adjustable in length and introduces forces into the panel, by way of the levers, which produce two oppositely directed bending moments and elastically bend the panel to produce a desired bending line.

2. Reflector according to claim 1, wherein the bending moments are of different magnitudes.

3. Reflector according to claim 1, wherein the panel comprises a reflective layer.

4. Reflector according to claim 3, wherein the reflective layer is applied to the panel in a shape-fit manner.

5. Reflector according to claim 1, wherein the forces introduced into the panel, by way of the levers are absorbed by a tensioning construction.

6. Reflector according to claim 1, wherein the levers that are attached at an angle are of different lengths.

7. Reflector according to claim 1, wherein torsional traverses are affixed on every panel side, and wherein the forces introduced into the panel, by way of the levers are introduced by means of a means that is adjustable in length, in such a manner that two oppositely directed bending moments occur, and the two bending moments elastically bend the panel to produce a desired bending line.

8. Reflector according to claim 7, wherein the width of the two traverses is different.

9. Reflector according to claim 7, wherein the means is a pressure element and the pressure forces are absorbed by a flexurally rigid torsion traverse.

10. Reflector according to claim 7, wherein the means is a tension element that is adjustable in length.

11. Reflector according to claim 1, wherein a cam is installed in the tension or pressure element, and a rotation of the panel associated with tracking the sun produces a radius enlargement of the reflector by means of the cam, coupled with this rotation, wherein the radius of the reflector is individually adjusted by biasing the pressure or tension element.

* * * * *